350-437 SR
E297A XR 3,331,277

July 18, 1967 H. WEHDE 3,331,277

CHARACTER PROJECTION DEVICE

Filed Sept. 1, 1965 2 Sheets-Sheet 1

INVENTOR
Heinz Wehde

BY Spencer & Kaye
ATTORNEYS

OR 353-15

INVENTOR
Heinz Wehde

BY Spencer & Kaye

ATTORNEYS

United States Patent Office 3,331,277
Patented July 18, 1967

3,331,277

CHARACTER PROJECTION DEVICE

Heinz Wehde, Heidelberg, Germany, assignor to Teldix Luftfahrt-Ausrustungs-G.m.b.H., Heidelberg-Wieblingen, Germany Filed Sept. 1, 1965, Ser. No. 484,272
Claims priority, application Germany, Sept. 5, 1964, T 26,950
7 Claims. (Cl. 88—24)

ABSTRACT OF THE DISCLOSURE

A plurality of light sources, each comprising a lens lamp, are arranged parallel to each other in front of a plurality of stationary symbols each of which corresponds to one of the light sources. Optical deflection means are positioned between the lens lamps and the stationary symbols to direct light beams from each lens lamp to the corresponding stationary symbol for projection on a common screen. The stationary symbols can be numbers, letters, or any other indicia which are to be selectively projected onto a common screen.

SPECIFICATION

The present invention relates to multiple projection devices for luminous symbols wherein incandescent lamps are used as the light sources, these lamps being arranged in such a manner that their central axes extend in parallel to one another, while the central axes of the projection systems converge.

Multiple projection devices in miniature have been developed for the indication of luminous markings, for example, digits or letters, and are generally used as components in control or monitoring systems in the form of a plug-in unit. In these multiple projection devices, a plurality of fixedly mounted symbols, each of which has a light source and a projection system assigned to it, are selectively projected upon a common ground-glass screen by switching on the light source corresponding to the desired symbol. The expression "projection system" covers the means conventional in such projection devices, required for influencing the course of the beam of the individual marker. Generally, these systems comprise a condenser lens, an object to be projected, an image lens, and any diaphragms that may be required. All projection systems have linear central axes focused upon the central point of the screen with the screen being viewed from the opposite side.

The arrangement of lamps having their central axes extending parallel to one another, while the central axes of the system converges has found wide acclaim, especially in the case of plug-in units, because the cross section of the housing can be kept small on account of this feature. The sought-for feature in multiple projection devices is to make the cross section of the housing hardly any larger than the surface of the screen. Therefore, the miniature incandescent lamps which normally are elongated must extend parallel to the central axis of the housing, with this axis representing the central axis of the entire device and penetrating the screen at right angles in its central point.

In the known multiple projection devices having parallel incandescent lamp axes and convergent projection systems, lamps are used whose glass bulbs have a uniform wall thickness in the area of penetration of the light beam. Such lamps illuminate a relatively large solid angle with a rather uniform light intensity. However, only a narrow cone of light is effective whose apex lies in the beam center and whose apex angle is determined by the diameter of the condenser lens and the distance of the lens from the center of the light beam. In contradistinction thereto, in the conventional so-called lens lamps, due to a local thickening of the wall of the glass bulb, a refraction of the light rays takes place such that a collimated light beam is produced whose rays are parallel or only diverging to a minor degree and have a comparatively higher light intensity. However, since the axis of this light beam is aligned with the axis of the lamp and thus does not coincide with the axis of the projection system pertaining thereto, lens lamps could not be employed in multiple projection systems of the above-described type.

It is an object of the present invention to provide a multiple projection device wherein the luminous intensity of the markers is increased while retaining the angular axis arrangement of lamps and projection system.

It is another object to provide a multiple projection device wherein lens lamps are used in the angular axis arrangement of lamps and projection system.

It is still another object of the present invention to provide a multiple projection device of small dimensions.

In accordance with the present invention, between the light sources and the projection systems of the device, there is provided a deflection arrangement comprising at least one optical body whereby this arrangement deflects the emanating light beams toward the center of the screen.

Basically, prismatic or prism-like bodies are suitable for the deflection unit. In fact, an essential discovery of this invention is that even a body which is not exactly prismatic can satisfactorily fulfill the task of deflecting the so-to-seek "crude" light beams emanating from the lamp. Therefore, only the projection system proper which produces a sharp picture of the object to be reproduced has to meet higher requirements as to accuracy.

Beginning with prismatic deflection bodies, there is some difficulty, particularly in the case of small dimensions of the device, in adjusting the individual prismatic bodies which differ from one another with respect to their angles of refraction, to the projection systems pertaining thereto. In order to simplify the projection device, the present invention therefore provides a radial arrangement of the light sources and a radial construction of the deflection unit with the unit and light sources being symmetrical with respect to the central axis. A particularly simple arrangement consists in distributing the light sources along two concentric circles around a light source provided in the central axis. In such an arrangement, only two types of optical bodies are required, as only two types of angles of refraction occur. Thus, the optical bodies can also be arranged in two concentric circles.

Another feature of the present invention comprises combining the optical bodies having the same angle of refraction to form conical annular disks. This is the above mentioned situation wherein true prisms are eliminated for the sake of advantages obtained in the manufacture and simpler mounting and adjusting procedures.

A further feature yielding even more pronounced advantages in simplifying the device consists in providing a common, graduated conical lens made of one piece and having a planar central field for all light sources.

Additional objects and advantages of the present invention will become apparent upon consideration of the following description when taken in conjunction with the accompanying drawings in which.

Figures 1, 2:
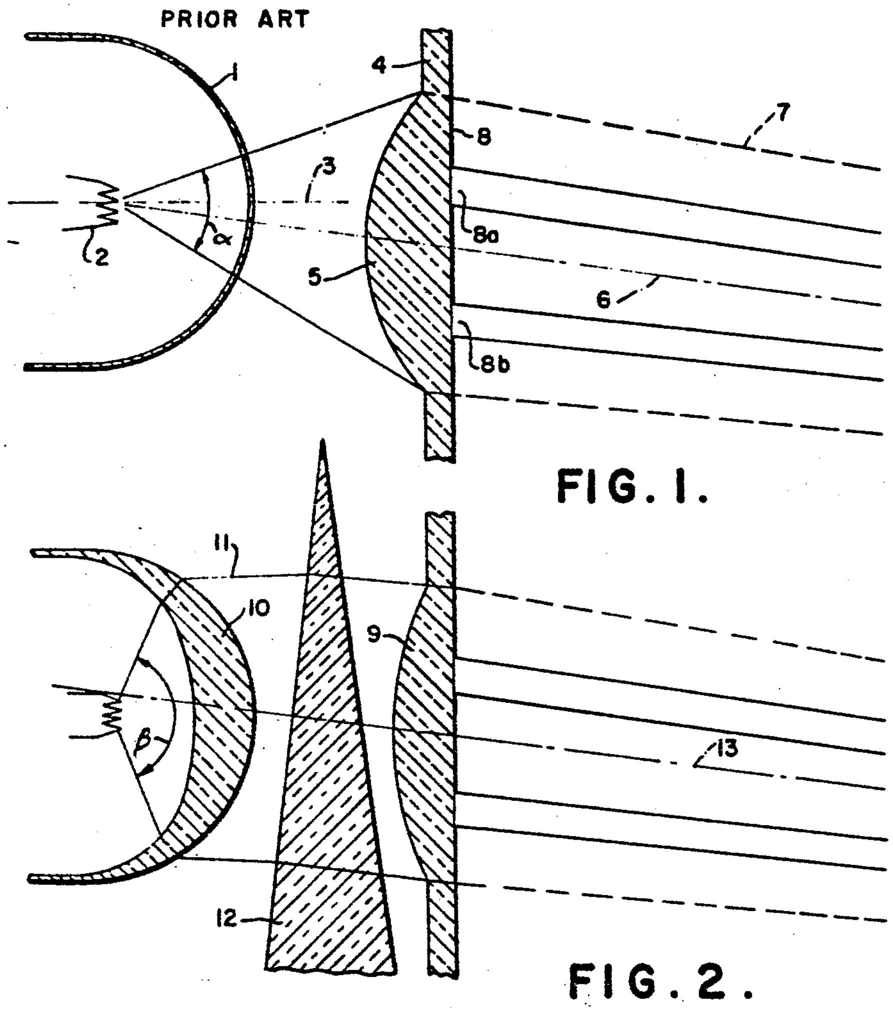
FIGURE 1 is a longitudinal sectional view of a prior art projection system and shows the course of the beam in connection with a condenser lens plate when using a customary incandescent lamp.
FIGURE 2 is a longitudinal sectional view of a system arrangement according to the present invention and shows the beam course in connection with a lens lamp.

Referring now to the drawings, there is shown in FIGURE 1 a prior art arrangement including a lamp having a glass bulb with a front position 1 and an incandescent spiral filament 2. The lamp has a central axis 3 which passes through the center of the beam located approximately in the center of the filament. A condenser lens 5 is provided within a condenser lens plate 4. A projection system, which is not shown in its entirety, has a central axis 6 which passes approximately through the center of the mass of the condenser lens 5 and through the center of the beam. The axes 3 and 6 form an angle of about 7°, which is of little consequence for the beam path in the projection system, inasmuch as the lamp illuminates a much larger solid angle than utilized, this illumination being approximately uniform. The only portion utilized is a light cone whose apex angle $\alpha$ is about 50°. The condenser lens 5 combines the light rays to a slightly converging light beam 7 being directed to an image lens. The rear surface of the condenser lens plate 4 is covered with an opaque layer 8 provided with light-permeable places 8*a* and 8*b* in the shape of the symbol to be projected. The entire light beam indicated by the dashed lines is thus screened out up to the small portion penetrating through the light-permeable places of the layer 8.

In FIGURE 2, a somewhat flatter condenser lens 9 is illustrated. The glass bulb of the incandescent lamp is characterized by a lens-like thickening 10 provided symmetrical to the axis of the lamp, this thickening refracting the light rays emanating from the center of radiation. Therefore, a slightly diverging light beam 11 is produced containing all the light emitted within a cone having the apex angle $\beta$. The angle $\beta$ is generally more than double the angle $\alpha$ of FIGURE 1. The corresponding solid angles, however, have the ratio of approximately 4:1, so that the light beam 11 contains about four times as much light as the light cone impinging upon the condenser lens 5 in FIGURE 1. The central axis of the light beam 11, not shown in the drawing, extends, however, in the direction of the axis of the lamp, so that the projection system would not be sufficiently illuminated. Therefore, a prism 12 is provided in accordance with the invention. This prism deflects the light beam in such a manner that its axis coincides with the projection axis. The light beam thereby completely illuminates the condenser lens 9 and is combined by the latter to a slightly converging new beam corresponding exactly to the beam 7 of FIGURE 1 with respect to shape and direction, but being substantially brighter.

Still another important advantage of the invention can be seen from FIGURES 1 and 2. While the radiation center of the lamp, as shown in FIGURE 1, lies in the axis 6 of the projection system, the axis 13 of the projection system of FIGURE 2 passes above the center of the beam produced by the lamp. Thus, in comparison to FIGURE 1, the lens lamp is positioned considerably closer to the central axis and the closer positioning thereby allows the cross section of the housing to be decreased.

Figure 3:
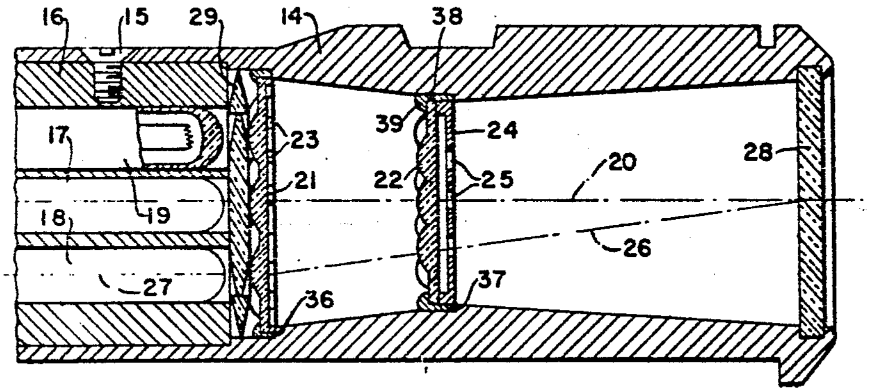
FIGURE 3 is a longitudinal sectional view of the front portion of a multiple projection device according to the present invention.

In FIGURE 3, there is shown a multiple projection device having a housing 14 and an insert portion 16 having suitable bores for carrying the lamps being fastened to the housing by a screw 15. Three lamps, 17, 18 and 19, partially in section, are shown within the bores. The lamp 17 and the projection system pertaining thereto are aligned with the central axis 20 of the housing. The condenser lenses of the projection systems are combined to form a condenser lens plate 21, and the image lenses are combined to form an image lens plate 22. The symbols 23 to be projected are embossed in a relief manner on the planar rear surface of the condenser lens plate. After previously coloring the entire rear surface black, the surface is ground superficially, so that the lacquer is abraded on the raised portions and the symbols are thus rendered light-permeable. In front of the image lens plate 22, there is additionally provided a diaphragm plate 24 having circular apertures 25; this plate prevents interfering stray light from passing therethrough. The axis of the lower projection system lying in the sectional plane is designated by 26, and the central axis of the lamp 18 pertaining thereto by 27. The axes of all of the projection systems meet in the center point of a screen 28 mounted at the front of the housing with the screen being viewed from the outside. In accordance with the invention, a graduated conical lens 29 is inserted between the lamp insert 16 and the condenser lens plate, this conical lens being described in more detail in the following figures.

Figure 4:
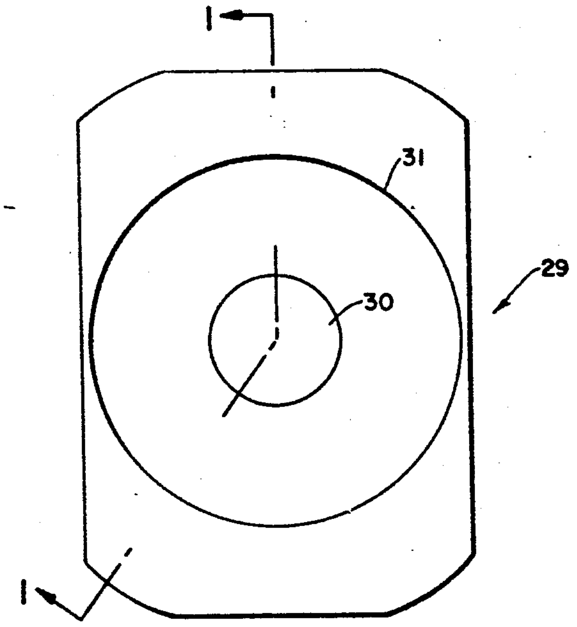
FIGURE 4 is a plan view of a graduated conical lens in accordance with the invention.
Figure 5:
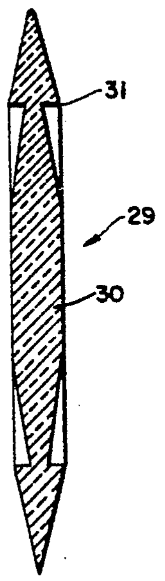
FIGURE 5 is a cross sectional view through the lens of FIGURE 4 taken along the section lnie I—I.

The shape of the conical lens which is adapted to the rectangular format of the housing and the screen is shown in FIGURES 4 and 5. The conical lens is graduated in that it has a circular planar central area 30 and tapers towards the sides in double-conical manner up to a shoulder 31. At this shoulder, the surfaces rises, in both directions, at right angles to the plane of the drawing up to the thickness of the central area 30. The body then again tapers in double-conical manner toward the outside, the angle at the shoulder 31 (wedge angle) being, however, larger than the angle in the intermediate region 30.

Figure 6:
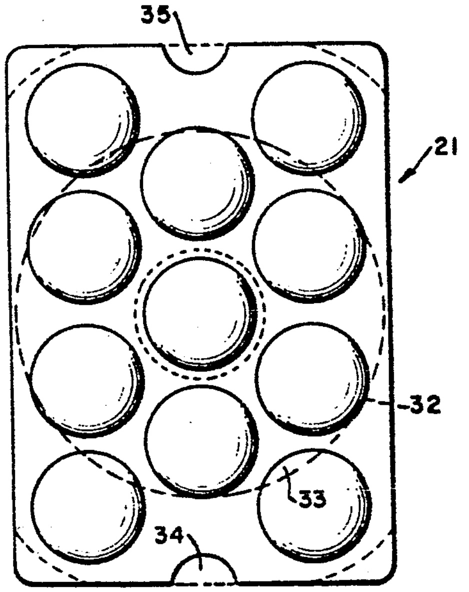
FIGURE 6 is a plan view of a condenser lens plate according to the present invention with the edges and contour lines of the conical lens of FIGURE 4 being shown in dashed lines.

This advantageous shaping of the optical body of the deflection arrangement of course is dependent upon the distribution of the lamps and the projection systems along the cross section of the housing, as shown in FIGURE 6. The condenser lens plate 21 illustrated herein is provided with eleven lenses and is of rectangular configuration and slightly rounded edges. The central lens is located in the point of intersection of the central axes of the rectangle. Around this central lens, six further lenses are provided at equal spacings from one another in a first ring and another ring with four lenses follows. The four lenses of the second ring fill the corners of the rectangle and have the same spacing from the lenses in the first ring closest to them as the other lenses have with respect to one another.

Thus, there result three columns of respectively four, three, and four lenses, these columns being parallel to the longitudinal axis of the rectangle and offset with respect to one another. The image lenses on plate 22 and the bores in the insert 16 for receiving the incandescent lamps also correspond to this arrangement.

The above-described concentric arrangement of the lenses and lamps is of great importance because of the fact that such an arrangement makes it possible to shape the conical lens in a simple way. The contours of the conical lens are shown in FIGURE 6 in dashed lines. The diameter of the planar central area 30 is somewhat larger than the diameter of the central condenser lens. The following ring of six condenser lenses, however, is not completely covered by the intermediate region of the conical lens. The shoulder 31 separating the intermediate region from the outer region of the conical lens, rather, separates small segments 32 and 33, respectively, from the six condenser lenses. However, this is of minor consequence for illuminating the symbols since the presence of stray light with the aid of a suitable configuration and arrangement of the symbols compensate for the minor loss of illumination and therefore clear images can be obtained.

The conical lens 29 is just inserted within the housing as shown in FIGURE 3 without the need of special mountings. For fastening the lens plates, semicircular recesses 34 and 35 are provided, inter alia, these recesses being located at the narrow sides of the plates and illustrated in FIGURE 6. As shown in FIGURE 3, the plates are received by suitable stops 36 and 37 at the inner wall of the housing (see FIGURE 3). The recesses 34 and 35 of the lens plates are received by projections 38 having the same cross section and extending along the inner wall in the longitudinal direction of the housing. After the lens plates have been inserted and thus adjusted during the assemblage, these projections are bent by means of a heated tool, if desired, so that thickened flange portions 39 are formed which retain the lens plates.

Thus, according to the present invention, there is provided a multiple projection device having eleven different luminous markings within a housing of previously unattained small dimensions. The screen area is, for example, 7 x 10 mm.

It will be understood that the above description of the present invention is susceptible to various modifications, changes, and adaptations, and the same are intended to be comprehended within the meaning and range of equivalents of the appended claims.

What is claimed is:

1. In a multiple projection device for luminous symbols wherein a plurality of stationary symbols having coordinated therewith respectively one light source and one projection system are projected selectively onto a common screen, each of the light sources having a central axis which extends in parallel to the others and each of the projection systems having a linear axis which converges with the other linear axes in a central point of the common screen, the improvement wherein each of said light sources comprises a lens lamp, and further comprising a deflecting means provided between the lens lamps and the projection systems for deflecting an emitted light beam toward the central portion of the screen, said deflection means including at least one optical body.

2. A multiple projection device for luminous symbols having a housing and a central axis, said device comprising in combination:

a plurality of lens lamps provided at one end of the housing, each of said lens lamps having a central axis which extends parallel to the others;

a screen provided at the other end of the housing;

a plurality of projection systems provided within the housing, each of said projection systems having a linear axis which converges together with the other linear axes in a central point of said screen;

a plurality of stationary symbols provided within the housing, each of said symbols having coordinated therewith respectively one of said lens lamps and one of said projection systems for selective projection of said symbols onto said screen; and a deflecting means interposed between said lens lamps and said projection systems for deflecting an emitted light beam toward a central portion of said screen, said deflecting means including at least one optical body.

3. A projection device as defined in claim 2, wherein said lens lamps and said deflection means are radially arranged, said arrangement of said lens lamps and said deflection means being symmetrical with respect to the central axis of the device.

4. A projection device as defined in claim 3 wherein said lens lamps and said projection systems are arranged along two concentric rings around a lens lamp and its respective projection system located in the central axis; and said deflection means being provided with optical bodies having two different angles of refraction, said bodies being correspondingly arranged in two concentric rings.

5. A projection device as defined in claim 4 wherein said optical bodies having the same angle of refraction are combined to form conical annular disks.

6. A projection device as defined in claim 5 wherein said deflecting means comprises a graduated conical lens common to each of said lens lamps, said conical lens being of one piece construction and having a planar central portion.

7. A multiple projection device for luminous symbols having a housing and a central axis, said device comprising in combination:

a plurality of lens lamps provided at one end of the housing, each of said lens lamps having a central axis which extends parallel to the others, said plurality of lens lamps being radially arranged along two concentric rings around a lens lamp located in the central axis of the device;

a screen provided at the other end of the housing;

a plurality of projection systems provided within the housing, each of said projection systems having a linear axis which converges together with the other linear axes in a central point of said screen, said projection systems being radially arranged in two concentric rings around a projection system located in the central axis of the housing for cooperation with said radially arranged lens lamps;

a plurality of stationary symbols provided within the housing, each of said symbols having coordinated therewith respectively one of said lens lamps and one of said projection systems for selective projection of said symbols onto said screen; and a deflecting means interposed between said lens lamps and said projection systems for deflecting an emitted light beam from said light sources onto the respective projection system, said deflecting means permitting said linear axes of said radially arranged projection systems to pass radially outwardly of said central axes of said radially arranged lens lamps, thereby permitting a closer positioning of lens lamps to the central axis of the devices, whereby a reduction in the cross-section of the housing of the device is obtained.

References Cited

UNITED STATES PATENTS

| | | | |
|---|---|---|---|
| 2,392,224 | 1/1946 | Bryce | 95—4.5 |
| 2,900,884 | 8/1959 | Coleman | 95—4.5 |
| 3,149,259 | 9/1964 | Sassmannshavsen | 240—41.3 |
| 3,244,071 | 4/1966 | Gumpertz | 88—1 |

NORTON ANSHER, *Primary Examiner.*

R. M. SHEER, *Assistant Examiner.*